(12) United States Patent
Gillman et al.

(10) Patent No.: US 6,824,821 B1
(45) Date of Patent: Nov. 30, 2004

(54) PROCESS FOR PREPARING COMPACTED PIGMENT GRANULES, PROCESS FOR PREPARING ENCAPSULATED PIGMENT GRANULES, AND PROCESS FOR DYEING LANDSCAPING AND/OR CONSTRUCTION MATERIALS

(76) Inventors: Zachary Gillman, 1955 Moulton Hill Road, Lennoxville, Quebec (CA), J1M 2A2; Martin Chasse, 4421 Pavillon apt 42, Rock Forest, Quebec (CA), J1M 2A2

( * ) Notice: Subject to any disclaimer, the term of this patent is extended or adjusted under 35 U.S.C. 154(b) by 0 days.

(21) Appl. No.: 09/909,682

(22) Filed: Jul. 20, 2001

Related U.S. Application Data
(60) Provisional application No. 60/220,129, filed on Jul. 21, 2000.

(51) Int. Cl.[7] ................................................. B05D 7/00
(52) U.S. Cl. ........................ 427/212; 427/215; 427/220; 427/221; 427/377; 427/385.5
(58) Field of Search ................................ 427/212, 215, 427/220, 221, 377, 385.5

(56) References Cited

U.S. PATENT DOCUMENTS

| | | | |
|---|---|---|---|
| RE20,776 E | 7/1938 | Amon | 106/24 |
| 2,221,175 A | 11/1940 | Bechtold | 186/27 |
| 3,068,109 A | 12/1962 | Rodeffer | 106/98 |
| 3,843,380 A | 10/1974 | Beyn | |
| 4,162,287 A | 7/1979 | Gunnell et al. | 264/117 |
| 4,221,829 A * | 9/1980 | Vargiu et al. | 427/222 |
| 4,264,552 A | 4/1981 | McMahon et al. | |
| 4,308,073 A | 12/1981 | Mills | 106/307 |
| 4,336,546 A | 6/1982 | Edwards et al. | 346/74.7 |
| 4,366,139 A | 12/1982 | Kuhner et al. | 423/449 |
| 4,409,171 A * | 10/1983 | Leon et al. | 264/120 |
| 4,451,231 A | 5/1984 | Murray | 432/13 |
| 4,501,593 A * | 2/1985 | Paersch et al. | 44/23 |
| 4,946,505 A * | 8/1990 | Jungk | 106/712 |
| 5,401,313 A | 3/1995 | Supplee et al. | |
| 6,241,167 B1 | 6/2001 | Linde et al. | 241/3 |
| 6,384,126 B1 * | 5/2002 | Pirtle et al. | 524/493 |

FOREIGN PATENT DOCUMENTS

| | | | |
|---|---|---|---|
| AU | 381299 B | 9/1986 | |
| DE | 2425234 | 12/1975 | |
| DE | 2940156 | 4/1980 | C09C/3/00 |
| GB | 1537663 | 1/1979 | C04B/13/21 |
| JP | 149224 | 12/1978 | |
| JP | 358087195 A * | 5/1983 | |
| JP | 58125759 | 7/1983 | |
| NL | 7605527 | 11/1977 | |
| WO | 8707595 | 12/1987 | C04B/20/02 |

* cited by examiner

*Primary Examiner*—Elena Tsoy
(74) *Attorney, Agent, or Firm*—Pandiscio & Pandiscio

(57) ABSTRACT

A process for preparing compacted pigment granules, a process for preparing encapsulated pigment granules, and a process for dyeing landscaping and/or construction materials using the same.

1 Claim, 1 Drawing Sheet

US 6,824,821 B1

PROCESS FOR PREPARING COMPACTED PIGMENT GRANULES, PROCESS FOR PREPARING ENCAPSULATED PIGMENT GRANULES, AND PROCESS FOR DYEING LANDSCAPING AND/OR CONSTRUCTION MATERIALS

REFERENCE TO PENDING PRIOR PATENT APPLICATION

This patent application claims benefit of pending prior U.S. Provisional Patent Application Serial No. 60/220,129, filed Jul. 21, 2000 by Zachary Gillman et al. for THE GRANSTAR PROCESS, which patent application is hereby incorporated herein by reference.

FIELD OF THE INVENTION

This invention relates to processes for preparing pigment granules and to processes for dyeing landscaping and/or construction materials.

BACKGROUND OF THE INVENTION

In many situations landscaping and/or construction materials may need to be dyed so as to impart a desired color to the material. By way of example, bark and/or wood mulch and/or concrete may need to be dyed so as to impart a desired color to the material and thereby render the material more pleasing in an architectural setting.

A number of different pigments are known in the art for mixing with landscaping and/or construction materials so as to impart the desired color to those construction materials. By way of example, iron oxides are capable of providing different colors commonly of interest (e.g., Red $Fe_2O_3$, Yellow $Fe_2O_3.H_2O$, Black $Fe_3O_4$), and have the additional advantage that they may be effectively dispersed throughout the landscaping and/or construction material with the presence of ordinary water.

Unfortunately, however, iron oxide pigments generally come in the form of a fine powder which creates a number of problems during use. For one thing, pigment dust tends to migrate, soiling human beings, equipment and the surrounding premises. In addition, when the pigment powder is stored for any length of time, it tends to clump together into masses which are no longer freely flowable, thus complicating mixing of the pigment powder with the landscaping and/or construction materials which are to be dyed.

SUMMARY OF THE INVENTION

As a result, one object of the present invention is to provide a novel process for preparing compacted pigment granules which will remain free flowing after storage for a reasonable length of time, yet may thereafter be effectively dispersed throughout the landscaping and/or construction material with the presence of ordinary water.

Another object of the present invention is to provide a novel process for preparing encapsulated pigment granules which will remain free flowing after storage for a reasonable length of time, yet may thereafter be effectively dispersed throughout the landscaping and/or construction material with the presence of ordinary water.

And another object of the present invention is to provide a novel process for dyeing landscaping and/or construction materials using the aforementioned compacted pigment granules.

And another object of the present invention is to provide a novel process for dyeing landscaping and/or construction materials using the aforementioned encapsulated pigment granules.

These and other objects are addressed by the present invention, which provides a process for preparing compacted pigment granules, a process for preparing encapsulated pigment granules, and a process for dyeing landscaping and/or construction materials using the same.

In one form of the invention, there is provided a novel process for preparing compacted pigment granules, comprising the steps of: (1) loading 1000 kg to 3000 kg of iron oxide powder having a grain size of not less than 0.8 microns, at a temperature of 15–20 degrees C., into a mixer rotating at a speed of 1–25 rpm; (2) spraying, while the mixer is rotating, liquid binder solution onto the cascading pigment powder, where the liquid binder solution is made by mixing 200–850 liters of water with 2.5–15 kg of polyvinyl alcohol binder powder, and where the liquid binder solution is sprayed at a rate of 10–50 gallons per hour, for 1–4 hours, whereby the cascading pigment powder is compacted into dense granules of approximately 0.30–1.20 mm diameter and having a moisture content of approximately 10–14%; and (3) directing, while the mixer is rotating, heated air at a temperature of 200–600 degrees C. onto the compacted pigment granules, so that the compacted pigment granules are dried at a temperature of approximately 50–100 degrees C., and continuing this process for approximately 2–3 hours until the moisture content of the compacted pigment granules is reduced to approximately 2% or less, whereupon the compacted pigment granules are removed from the mixer.

In another form of the invention, there is provided a novel process for preparing encapsulated pigment granules, comprising the steps of: (1) loading 1000–3000 kg of iron oxide powder having a grain size of not less than 0.8 micron, at a temperature of 15–20 degrees C., into a mixer rotating at a speed of 1–25 rpm; (2) rotating the mixer for approximately 0.5–2.0 hours, with the pigment powder cascading within the mixer so as to result in the formation of pigment granules of approximately 0.3–1.20 mm diameter; (3) spraying, while the mixer is rotated, liquid encapsulation solution onto the cascading pigment granules, where the liquid encapsulation solution is made by mixing 200–850 liters of water with 2.5–15 kg of polyvinyl alcohol encapsulation powder, and where the liquid encapsulation solution is sprayed at a rate of 40–200 liters per hour, for 1–4 hours, whereby the liquid encapsulation solution encapsulates the cascading pigment granules, with the encapsulated pigment granules having a diameter of approximately 0.30–1.20 mm diameter and a moisture content of approximately 10–14%; and (4) directing, while the mixer is rotating, heated air at a temperature of 200–600 degrees C. onto the encapsulated pigment granules, so that the encapsulated pigment granules are dried at a temperature of approximately 50–100 degrees C., and continuing this process for approximately 2–3 hours until the moisture content of the encapsulated pigment granules is reduced to approximately 2% or less, whereupon the encapsulated pigment granules are removed from the mixer.

In another form of the invention, there is provided a novel process for dyeing landscaping and/or construction materials using compacted pigment granules, comprising the steps of: (1) preparing compacted pigment granules by (i) loading 1000–3000 kg of iron oxide powder having a grain size of not less than 0.8 micron, at a temperature of 15–20 degrees C., into a mixer rotating at a speed of 1–25 rpm; (ii) spraying, while the mixer is rotating, liquid binder solution onto the cascading pigment powder, where the liquid binder solution is made by mixing 200–850 liters of water with 2.5–15 kg of polyvinyl alcohol binder powder, and where the liquid binder solution is sprayed at a rate of 40–200 liters per hour, for 1–4 hours, whereby the cascading pigment powder is compacted into dense granules of approximately 0.30–1.20 mm diameter and having a moisture content of approximately 10%–14%; and (iii) directing, while the mixer is rotating, heated air at a temperature of 200–600 degrees C. onto the compacted pigment granules, so that the compacted pigment granules are dried at a temperature of approximately 50–100 degrees C., and continuing this process for approximately 2–3 hours until the moisture content of the compacted pigment granules is reduced to approximately 2% or less, whereupon the compacted pigment granules are removed from the mixer; and (2) mixing the compacted pigment granules with the landscaping and/or construction materials in an environment where water is present, whereby the compacted pigment granules will break down and release their pigment powder for mixing with the landscaping and/or construction materials, whereby to dye the same.

In another form of the invention, there is provided a novel process for dyeing landscaping and/or construction materials using encapsulated pigment granules, comprising the steps of: (1) preparing encapsulated pigment granules by (i) loading 1000–3000 kg of iron oxide powder, at a temperature of 15–20 degrees C., into a mixer rotating at a speed of 1–25 rpm; (ii) rotating the mixer for approximately 0.5–2.0 hours, with the pigment powder cascading within the mixer so as to result in the formation of pigment granules of approximately 0.30–1.20 mm diameter; (iii) spraying, while the mixer is rotated, liquid encapsulation solution onto the cascading pigment granules, where the liquid encapsulation solution is made by mixing 200–850 liters of water with 2.5–15 kg of polyvinyl alcohol encapsulation powder, and where the liquid encapsulation solution is sprayed at a rate of 40–200 liters per hour, for 1–4 hours, whereby the liquid encapsulation solution encapsulates the cascading pigment granules, with the encapsulated pigment granules having a diameter of approximately 0.30–1.20 mm diameter and a moisture content of approximately 10–14%; and (iv) directing, while the mixer is rotating, heated air at a temperature of 200–600 degrees C. onto the encapsulated pigment granules, so that the encapsulated pigment granules are dried at a temperature of approximately 50–100 degrees C., and continuing this process for approximately 2–3 hours until the moisture content of the encapsulated pigment granules is reduced to approximately 2% or less, whereupon the encapsulated pigment granules are removed from the mixer; and (2) mixing the encapsulated pigment granules with the landscaping and/or construction materials in an environment where water is present, whereby the encapsulated pigment granules will break down and release their pigment powder for mixing with the landscaping and/or construction materials, whereby to dye the same.

BRIEF DESCRIPTION OF THE DRAWING

These and other objects and features of the present invention will be more fully disclosed or rendered obvious by the following detailed description of the preferred embodiments of the invention, which are to be considered together with the accompanying drawing wherein like numbers refer to like parts and further wherein.

DETAILED DESCRIPTION OF THE PREFERRED EMBODIMENTS

Compacted Pigment Granules

Figure 1:
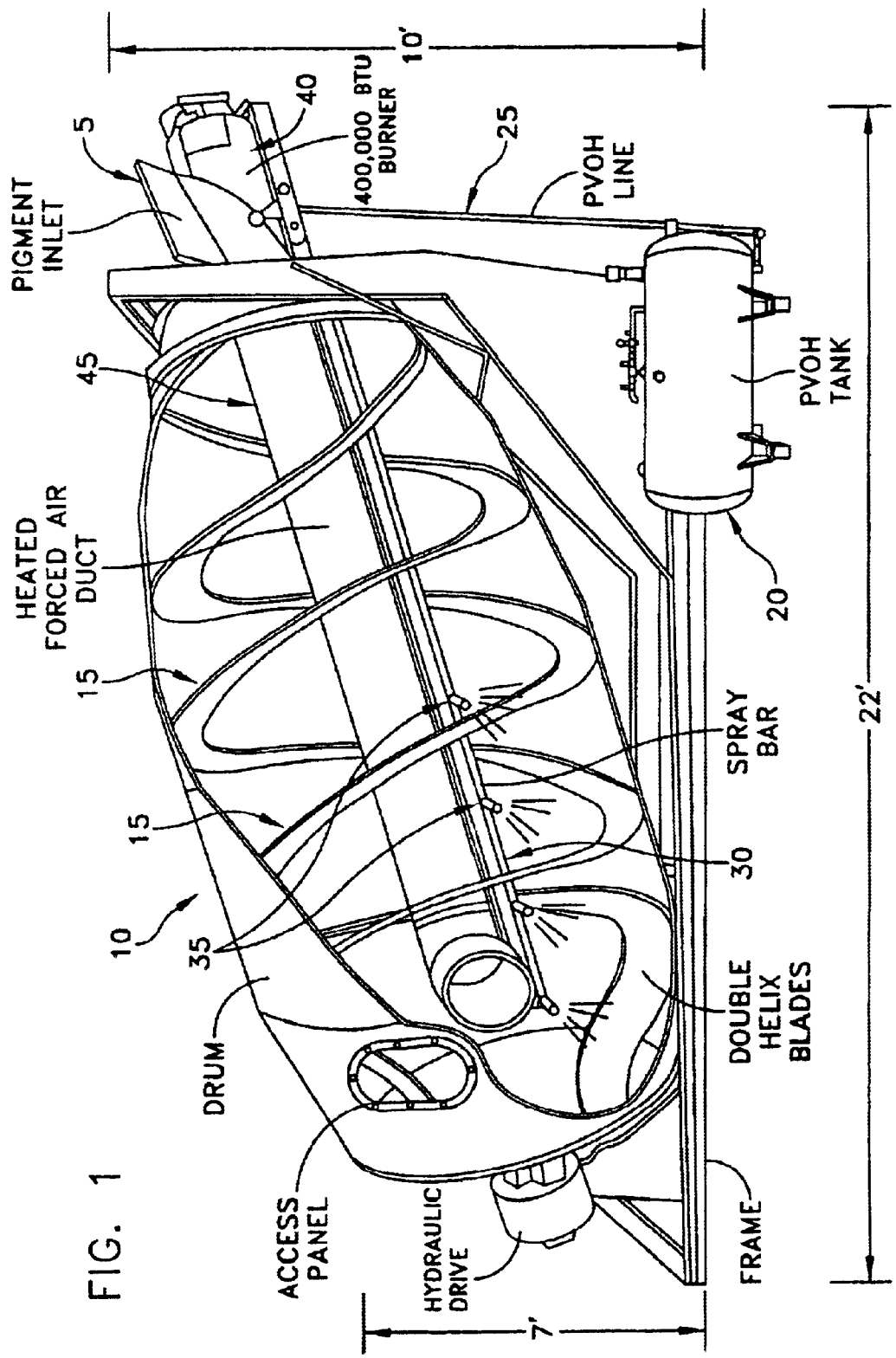
FIG. 1 is a schematic view of one form of apparatus which may be used to practice the present invention.

The process for making compacted pigment granules is a batch process that, in one preferred form of the invention, can accommodate approximately 1000–3000 kg of iron oxide pigment in a single batch.

Step 1: Loading The Mixer

The iron oxide pigment (Red $Fe_2O_3$, Yellow $Fe_2O_3.H_2O$, Black $Fe_3O_4$), in powder form having a grain size of not less than 0.8 micron, is conveyed down a steel chute 5 into the mixer 10. Preferably the mixer comprises a "Ready Mix" concrete mixer of the sort well known in the art. The mixer, inclined and turning clockwise at a speed of about 1–25 rpm, draws the pigment down to the back (i.e., bottom) of the mixer. The mixer has two opposing steel spiral blades 15 that run from the mouth (i.e., top) of the mixer to the back (i.e., bottom) of the mixer in a spiral pattern. The blades are preferably approximately 4–6 inches in width and extend for the length of the mixer, i.e., approximately 10–18 feet. The blades are designed to draw the pigment down to the back (i.e., bottom) of the mixer and work as paddles to lift the pigment, in a circular motion, from the back (i.e., bottom) of the mixer. As the mixer rotates, the paddles scoop up a quantity of pigment and, as the lifted pigment thereafter falls from 3–7 feet to the bottom of the mixer, causes that pigment to impact on the bottom of the mixer or on other pigment momentarily resting on the bottom of the mixer. The mixer rotates in a continuous motion, causing a continuous cascade of the pigment. The temperature of the pigment is approximately 15–25 degrees C.

Step 2: Introducing The Liquid Binder Solution

The liquid binder solution (PVOH) is prepared in advance in a separate storage tank (not shown). The liquid binder solution is made in a batch process, with a predetermined amount of water (e.g., approximately 200–850 liters) being heated to a temperature of approximately 50–80 degrees C., and then a predetermined amount (e.g., approximately 2.5–15 kg) of polyvinyl alcohol binder powder (e.g., such as the AIR VOL® Grade 203S product manufactured by the Polymer Division of Air Products and Chemical Inc.) is slowly added to the tank while the tank is stirred with a low shear impeller turning at approximately 1500 rpm, until all of the binder powder has dissolved into a homogenous solution so as to form the liquid binder solution. A predetermined volume of the liquid binder solution (e.g., approximately 200–850 liters), which corresponds to the amount needed for one mixer batch, is then transferred to a second storage tank 20. This second storage tank 20 is then pressurized to approximately 20–100 pounds per square inch. The second storage tank 20 is connected, via a pipeline 25, to a spray bar 30 that is located within the mixer. The spray bar preferably contains a plurality of nozzles 35, preferably placed approximately 12 inches apart for approximately 6 feet from the back of the mixer. Each nozzle 35 has an orifice of approximately 0.011 to 0.072 inches, which produces a spray pattern of approximately 110–250 degrees. Then, while the mixer is turned, the liquid binder solution is sprayed in an atomized form onto the pigment cascading within the mixer.

Step 3: The Compaction Process

As the pigment powder falls off the paddles in a sheet-like cascade, the atomized liquid binder solution contacts the falling pigment before the pigment impacts the bottom of the mixer and/or other pigment momentarily resting on the bottom of the mixer. Then, as the mixer continues to rotate, the pigment is lifted back up again and, as it falls, is sprayed with more liquid binder solution before again impacting the bottom of the mixer and/or other pigment momentarily resting on the bottom of the mixer. This process continues over and over, with the moisture content of the cascading pigment rising to approximately 10–14%. The repeated impacting of the falling pigment causes the pigment powder to compact into dense granules. This process continues until it reaches a designated point where the compacted pigment granules contain enough binder to maintain a stable dense granule of approximately 0.30–1.20 mm. This process takes approximately three hours.

Step 4: The Drying Process

After aforementioned compaction process has produced compacted pigment granules of the desired size, flow of the liquid binder solution is stopped. Then, while the mixer continues to rotate, the compacted pigment granules are dried. This is done by sending heated air (preferably generated by a 400,000 BTU forced air gas burner 40) down a steel tube 45 and into the interior of the mixer. This heated air has a temperature of approximately 200–600 degrees C. and is directed at the compacted pigment granules as the compacted pigment granules cascade over the paddles. This process gently heats up the compacted pigment granules to a temperature of approximately 50–100 degrees C. This process continues until the moisture content of the compacted pigment granules is reduced to approximately 2% or less. Preferably this is regulated by removing samples every 15 minutes or so until the proper moisture content is achieved. This generally takes approximately 2–3 hours.

Step 5: Emptying The Mixer

To discharge the compacted pigment granules from the mixer, rotation of the mixer is stopped and then reversed. This causes the compacted pigment granules to travel to the mouth of the mixer. The compacted pigment granules are then discharged into a steel hopper and packaged for shipping.

Step 6: Use

In use, the compacted pigment granules are mixed with the landscaping and/or construction materials in an environment where water is present, whereby the compacted pigment granules will break down and release their pigment powder for mixing with the landscaping and/or construction materials, whereby to dye the same.

EXAMPLE 1

The mixer is rotated at a speed of 6 rpm as 1000 kg of iron oxide powder is loaded into the mixer at a temperature of 20 degrees C. Then 140 liters of liquid binder solution, made by mixing 140 liters of water with 3 kg of polyvinyl alcohol binder powder, is sprayed onto the cascading pigment powder. The liquid binder solution causes the cascading pigment powder to form into dense granules. This process is continued for 2 hours, so that the cascading pigment powder is compacted into dense granules of approximately 1.0 mm diameter and having a moisture content of approximately 12%. Then heated air, at a temperature of 600 degrees C., is directed onto the compacted pigment granules, so that the compacted pigment granules are dried at a temperature of approximately 80 degrees C. This process is continued for approximately 3 hours until the moisture content of the compacted pigment granules is reduced to approximately 1%, whereupon the compacted pigment granules are removed from the mixer and packaged for end use.

EXAMPLE 2

The mixer is rotated at a speed of 6 rpm as 2000 kg of iron oxide powder is loaded into the mixer at a temperature of 20 degrees C. Then 280 liters of liquid binder solution, made by mixing 280 liters of water with 6 kg of polyvinyl alcohol binder powder, is sprayed onto the cascading pigment powder. The liquid binder solution causes the cascading pigment powder to form into dense granules. This process is continued for 4 hours, so that the cascading pigment powder is compacted into dense granules of approximately 1.0 mm diameter and having a moisture content of approximately 12%. Then heated air, at a temperature of 600 degrees C., is directed onto the compacted pigment granules, so that the compacted pigment granules are dried at a temperature of approximately 80 degrees C. This process is continued for approximately 3 hours until the moisture content of the compacted pigment granules is reduced to approximately 1%, whereupon the compacted pigment granules are removed from the mixer and packaged for end use.

EXAMPLE 3

The mixer is rotated at a speed of 6 rpm as 3000 kg of iron oxide powder is loaded into the mixer at a temperature of 20 degrees C. Then 420 liters of liquid binder solution, made by mixing 420 liters of water with 9 kg of polyvinyl alcohol binder powder, is sprayed onto the cascading pigment powder. The liquid binder solution causes the cascading pigment powder to form into dense granules. This process is continued for 3 hours, so that the cascading pigment powder is compacted into dense granules of approximately 1.0 mm diameter and having a moisture content of approximately 14%. Then heated air, at a temperature of 600 degrees C., is directed onto the compacted pigment granules, so that the compacted pigment granules are dried at a temperature of approximately 80 degrees C. This process is continued for approximately 3 hours until the moisture content of the compacted pigment granules is reduced to approximately 1%, whereupon the compacted pigment granules are removed from the mixer and packaged for end use.

Encapsulated Pigment Granules

The process for making encapsulated pigment granules is a batch process that, in one preferred form of the invention, can accommodate approximately 1000–3000 kg of iron oxide pigment in a single batch.

Step 1: Loading The Mixer

The iron oxide pigment (Red $Fe_2O_3$, Yellow $Fe_2O_3.H_2O$, Black $Fe_3O_4$), in powder form having a grain size of not less than 0.8 micron, is conveyed down a steel chute 5 into the mixer 10. Preferably the mixer comprises a "Ready Mix" concrete mixer of the sort well known in the art. The mixer, inclined and turning clockwise at a speed of about 1–25 rpm, draws the pigment down to the back (i.e., bottom) of the mixer. The mixer has two opposing steel spiral blades 15 that run from the mouth (i.e., top) of the mixer to the back (i.e., bottom) of the mixer in a spiral pattern. The blades are preferably approximately 4–6 inches in width and extend for the length of the mixer, i.e., approximately 10–18 feet. The blades are designed to draw the pigment down to the back (i.e., bottom) of the mixer and work as paddles to lift the pigment, in a circular motion, from the back (i.e., bottom) of the mixer. As the mixer rotates, the paddles scoop up a quantity of pigment and, as the lifted pigment thereafter falls from 3–7 feet to the bottom of the mixer, causes that pigment to impact on the bottom of the mixer or on other pigment momentarily resting on the bottom of the mixer. The mixer rotates in a continuous motion, causing a continuous cascade of the pigment. The temperature of the pigment is approximately 15–25 degrees C.

Step 2: Granule Formation

As the mixer rotates, the pigment powder naturally forms into compacted spheres of between approximately 0.30–1.20 mm. More particularly, the constant cascade action of the mixer causes the spheres to compact into a dense, spherically shaped granule of pigment. The mixer is rotated for approximately 2 hours as this occurs.

Step 3: Introducing The Liquid Encapsulation Solution

The liquid encapsulation solution (PVOH) is prepared in advance in a separate storage tank (not shown). The liquid encapsulation solution is made in a batch process, with a predetermined amount of water (e.g., approximately 200–850 liters) being heated to a temperature of approximately 50–80 degrees C., and then a predetermined amount (e.g., approximately 2.5–15 kg) of polyvinyl alcohol encapsulation powder (e.g., such as the AIR VOL® Grade 203S product manufactured by the Polymer Division of Air Products and Chemical Inc.) is slowly added to the tank while the tank is stirred with a low shear impeller turning at approximately 1500 rpm, until all of the encapsulation powder has dissolved into a homogenous solution so as to form the liquid encapsulation solution. A predetermined volume of the liquid encapsulation solution (e.g., approximately 200–850 liters), which corresponds to the amount needed for one mixer batch, is then transferred to the second storage tank 20. This second storage tank is then pressurized to approximately 20–100 pounds per square inch. The second storage tank 20 is connected, via a pipeline 25, to a spray bar 30 that is located within the mixer. The spray bar preferably contains a plurality of nozzles 35, preferably placed approximately 12 inches apart for approximately 6 feet from the back of the mixer. Each nozzle 35 has an orifice of approximately 0.011 to 0.072 inches, which produces a spray pattern of approximately 110–250 degrees. Then, while the mixer is turned, the liquid encapsulation solution is sprayed in an atomized form onto the pigment granules cascading within the mixer.

Step 4: The Encapsulation Process

As the pigment granules fall off the paddles in a sheet-like cascade, the atomized liquid encapsulation solution contacts the falling pigment granules and is coats each pigment granule before the pigment granule impacts the bottom of the mixer and/or other pigment granules momentarily resting on the bottom of the mixer. Then, as the mixer continues to rotate, the pigment granules are lifted back up again and, as they fall, are sprayed with more liquid encapsulation solution before again impacting the bottom of the mixer and/or other pigment granules momentarily resting on the bottom of the mixer. This process continues over and over, with the moisture content of the cascading pigment granules rising to approximately 10–14%. This process continues until it reaches a designated point where the compacted pigment granules have enough encapsulation to maintain a stable dense granule of approximately 0.30–1.20 mm. This process takes approximately three hours.

Step 5: The Drying Process

After aforementioned encapsulation process has produced encapsulated pigment granules of the desired size, flow of the liquid encapsulation solution is stopped. Then, while the mixer continues to rotate, the encapsulated pigment granules are dried. This is done by sending heated air (preferably generated by a 400,000 BTU forced air gas burner 40) down the steel tube 45 and into the interior of the mixer. This heated air has a temperature of approximately 200–600 degrees C. and is directed at the encapsulated pigment granules as the encapsulated pigment granules cascade over the paddles. This process gently heats up the encapsulated pigment granules to a temperature of approximately 50–100 degrees C. This process continues until the moisture content of the encapsulated pigment granules is reduced to approximately 2% or less. Preferably this is regulated by removing samples every 15 minutes or so until the proper moisture content is achieved. This generally takes approximately 2–3 hours.

Step 6: Emptying The Mixer

To discharge the encapsulated pigment granules from the mixer, rotation of the mixer is stopped and then reversed. This causes the encapsulated pigment granules to travel to the mouth of the mixer. The encapsulated pigment granules are then discharged into a steel hopper and packaged for shipping.

Step 7: Use

In use, the encapsulated pigment granules are mixed with the landscaping and/or construction materials in an environment where water is present, whereby the encapsulated pigment granules will break down and release their pigment powder for mixing with the landscaping and/or construction materials, whereby to dye the same.

EXAMPLE 4

The mixer is rotated at a speed of 10 rpm as 2000 kg of iron oxide powder (red) having a grain size of not less than 0.8 microns is loaded into the mixer at a temperature of 20 degrees C. The mixer is rotated for approximately 2 hours, with the pigment powder cascading within the mixer so as to result in the formation of compacted pigment granules of approximately 0.8 mm diameter. Then 280 liters of liquid encapsulation solution, made by mixing 280 liters of water with 6 kg of encapsulation powder, is sprayed onto the cascading pigment granules. The liquid encapsulation solution encapsulates the cascading pigment granules. This process is continued for 2 hours, so that the encapsulated pigment granules have a diameter of approximately 0.8 mm diameter and a moisture content of approximately 10%. Then heated air, at a temperature of 600 degrees C., is directed onto the encapsulated pigment granules, so that the encapsulated pigment granules are dried at a temperature of approximately 80 degrees C. This process is continued for approximately 3 hours until the moisture content of the encapsulated pigment granules is reduced to approximately 1%, whereupon the encapsulated pigment granules are removed from the mixer and packaged for end use.

EXAMPLE 5

The mixer is rotated at a speed of 10 rpm as 2000 kg of iron oxide powder (black) having a grain size of not less than 0.8 micron is loaded into the mixer at a temperature of 20 degrees C. The mixer is rotated for approximately 2 hours, with the pigment powder cascading within the mixer so as to result in the formation of compacted pigment granules of approximately 0.8 mm diameter. Then 280 liters of liquid encapsulation solution, made by mixing 280 liters of water with 6 kg of encapsulation powder, is sprayed onto the cascading pigment granules. The liquid encapsulation solution encapsulates the cascading pigment granules. This process is continued for 2 hours, so that the encapsulated pigment granules have a diameter of approximately 0.8 mm diameter and a moisture content of approximately 10%. Then heated air, at a temperature of 600 degrees C., is directed onto the encapsulated pigment granules, so that the encapsulated pigment granules are dried at a temperature of approximately 80 degrees C. This process is continued for approximately 3 hours until the moisture content of the encapsulated pigment granules is reduced to approximately 1%, whereupon the encapsulated pigment granules are removed from the mixer and packaged for end use.

EXAMPLE 6

The mixer is rotated at a speed of 10 rpm as 2000 kg of iron oxide powder (yellow) having a grain size of not less than 0.8 micron is loaded into the mixer a temperature of 20 degrees C. The mixer is rotated for approximately 2 hours, with the pigment powder cascading within the mixer so as to result in the formation of compacted pigment granules of approximately 1.0 mm diameter. Then 360 liters of liquid encapsulation solution, made by mixing 360 liters of water with 9 kg of encapsulation powder, is sprayed onto the cascading pigment granules. The liquid encapsulation solution encapsulates the cascading pigment granules. This process is continued for 2 hours, so that the encapsulated pigment granules have a diameter of approximately 1.0 mm diameter and a moisture content of approximately 14%. Then heated air, at a temperature of 600 degrees C., is directed onto the encapsulated pigment granules, so that the encapsulated pigment granules are dried at a temperature of approximately 80 degrees C. This process is continued for approximately 3 hours until the moisture content of the encapsulated pigment granules is reduced to approximately 1%, whereupon the encapsulated pigment granules are removed from the mixer and packaged for end use.

What is claimed is:

1. A process for preparing encapsulated pigment granules, comprising the steps of:
   (1) loading 1000–3000 kg of iron oxide powder, having a grain size of not less than 0.8 microns at a temperature of 15–20 degrees C., into a mixer rotating at a speed of 1–25 rpm;
   (2) rotating the mixer for approximately 0.5–2.0 hours, with the pigment powder cascading within the mixer so as to result in the formation of compacted pigment granules of approximately 0.30–1.20 mm diameter, with the compacted pigment granules being created solely through the action of rotational compaction and in the absence of a binder or encapsulation solution;
   (3) spraying, while the mixer is rotated, liquid encapsulation solution onto the cascading compacted pigment granules of approximately 0.30–1.20 mm diameter, where the liquid encapsulation solution is made by mixing 200–850 liters of water with 2.5–15 kg of polyvinyl alcohol encapsulating powder, and where the liquid encapsulation solution is sprayed at a rate of 40–200 liters per hour, for 1–4 hours, whereby the liquid encapsulation solution encapsulates the cascading, previously-formed compacted pigment granules, with the encapsulated compacted pigment granules having a diameter of approximately 0.30–1.2 mm diameter and a moisture content of approximately 10–14%; and
   (4) directing, while the mixer is rotating, heated air at a temperature of 200–600 degrees C. onto the encapsulated compacted pigment granules, so that the encapsulated compacted pigment granules are dried at a temperature of approximately 50–100 degrees C., and continuing this process for approximately 2–3 hours until the moisture content of the encapsulated compacted pigment granules is reduced to approximately 2% or less whereupon the encapsulated compacted pigment granules are removed from the mixer.

* * * * *